United States Patent
Biswas et al.

(10) Patent No.: US 7,280,557 B1
(45) Date of Patent: *Oct. 9, 2007

(54) MECHANISMS FOR PROVIDING STATEFUL NAT SUPPORT IN REDUNDANT AND ASYMETRIC ROUTING ENVIRONMENTS

(75) Inventors: Kaushik P. Biswas, San Jose, CA (US); Siva S. Jayasenan, Cupertino, CA (US); Mahadev Somasundaram, Santa Clara, CA (US); Mark A. Denny, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1093 days.

This patent is subject to a terminal disclaimer.

(21) Appl. No.: 10/187,168

(22) Filed: Jun. 28, 2002

(51) Int. Cl.
H04J 3/16 (2006.01)
(52) U.S. Cl. .................... 370/465; 711/202
(58) Field of Classification Search .......... 370/395.5, 370/466, 467, 465
See application file for complete search history.

(56) References Cited

U.S. PATENT DOCUMENTS

| | | | |
|---|---|---|---|
| 4,692,918 A | 9/1987 | Elliott et al. | |
| 5,016,244 A | 5/1991 | Massey, Jr. et al. | |
| 5,018,133 A | 5/1991 | Tsukakoshi et al. | |
| 5,218,600 A | 6/1993 | Schenkyr et al. | |
| 5,229,988 A | 7/1993 | Marbaker et al. | |
| 5,371,852 A | 12/1994 | Attanasio et al. | |
| 5,473,599 A | 12/1995 | Li et al. | |
| 5,572,528 A | 11/1996 | Shuen | |
| 5,619,552 A | 4/1997 | Karppanen et al. | |
| 5,729,537 A | 3/1998 | Billstrom | |
| 5,793,763 A | 8/1998 | Mayes et al. | |
| 5,825,759 A | 10/1998 | Liu | |
| 5,835,696 A | 11/1998 | Hess | |
| 5,862,345 A | 1/1999 | Okanoue et al. | |
| 5,862,451 A | 1/1999 | Grau et al. | |
| 5,943,604 A | 8/1999 | Chen et al. | |
| 6,078,575 A | 6/2000 | Dommety et al. | |
| 6,108,300 A | 8/2000 | Coile et al. | |
| 6,195,705 B1 | 2/2001 | Lueng | |
| 6,331,984 B1 | 12/2001 | Luciani | |
| 6,418,476 B1 | 7/2002 | Luciani | |
| 6,493,341 B1 * | 12/2002 | Datta et al. ................. | 370/392 |
| 6,512,774 B1 | 1/2003 | Vepa et al. | |
| 6,751,191 B1 | 6/2004 | Kanekar et al. | |
| 6,775,235 B2 | 8/2004 | Datta et al. | |
| 6,779,039 B1 | 8/2004 | Bommareddy et al. | |
| 6,801,949 B1 | 10/2004 | Bruck et al. | |

(Continued)

OTHER PUBLICATIONS

K. Egevang et al., "The IP Network Address Translator (NAT)", Network Working Group, pp. 1-10, May 1994, 9 pages.

(Continued)

*Primary Examiner*—Chi Pham
*Assistant Examiner*—Phuc Tran
(74) *Attorney, Agent, or Firm*—Beyer Weaver LLP

(57) ABSTRACT

Various techniques are described which may be used for improving traffic flows between private networks and public networks. According to one aspect of the present invention, a technique is described for implementing asymmetric routing in a NAT routing environment. Another aspect of the present invention provides a technique for implementing load balancing and resource allocation assignments among peers in a redundant, multiple NAT router environment.

37 Claims, 10 Drawing Sheets

U.S. PATENT DOCUMENTS

| | | | |
|---|---|---|---|
| 6,885,667 | B1 | 4/2005 | Wilson |
| 2002/0120697 | A1 | 8/2002 | Generous et al. |
| 2003/0131262 | A1* | 7/2003 | Goddard ............... 713/201 |
| 2003/0200463 | A1* | 10/2003 | McCabe ............... 713/201 |

OTHER PUBLICATIONS

Y. Rekhter et al., "Address Allocation for Private Internets," RFC: 1918, Network Working Group, Feb. 1996, 18 pages.

P. Srisuresh, et al. "Load Sharing Using IP Network Address Translation (LSNAT))," RFC 2391, Network Working Group, Aug. 1999, 30 pages.

E. Gerich, "Guidelines for Management of IP Address Space," RFC:1466, Network Working Group, May 1993, 10 pages.

Release notes for 3Com Corporation, "NETBuilder Family Bridge/Router", pp. 27-29, (Mar. 1994). J. Moy, RFC 1247 "OSPF Version 2", Jul. 19, 1991.

D. Oran, RFC 1142 OSI IS-IS Intra-domain Routing Protocol, Feb. 1990.

Black, Uyless, "TCP/IP and Related Protocols", McGraw-Hill, Inc., pp. 226-249, 1992.

G. Tsirtsis, P. Srisuresh, "Network Address Translation-Protocol Translation (NAT-PT)" RFC 2766, Feb. 2000, 19 pages.

T. Li, B. Cole, P. Morton, D. Li, Cisco Hot Standby Router Protocol (HSRP), Mar. 1998, 15 pages.

Chambless, et al., "Home Agent Redundancy Protocol (HARP), " Oct. 27, 1997.

C. Perkins, Network Working Group, RFC 2002 "IP Mobility Support," Oct. 1996.

C.E. Perkins and T. Jagannadh, "DHCP for Mobile Networking with TCP/IP," IBM, Watson Research Center IEEE, Apr. 1995.

3Com Corporation, "Configuring Boundary Routing System Architecture," NETBuilder Family Bridge/Router Release Notes, Mar. 1994, pp. 26-29.

Daruwalla, et al. "Method for a Cable Modem to Rapidly Switch to a Backup CMTS," U.S. Appl. No. 09/484,611, filed Jan. 18, 2000, 53 pages.

Zang, et al. "Cable Network Redundancy Architecture," U.S. Appl. No. 09/484,612, filed Jan. 18, 2000, 60 pages.

Nosella, et al. "Gateway Load Balancing Protocol," U.S. Appl. No. 09/883,674, filed Jun. 18, 2001, 48 pages.

Leung, et al. "Methods and Apparatus for Implementing Home Agent Redundancy," U.S. Appl. No. 10/008,494, filed Nov. 9, 2001, 53 pages.

Daruwalla, et al. "Routing Protocol Based Redundancy Design for Shared-Access Networks," U.S. Appl. No. 09/484,189, filed Jan. 18, 2000, 53 pages.

Kent Leung, "Mobile IP Mobility Agent Standby Protocol," U.S. Appl. No. 09/714,466, filed Nov. 14, 2000, 32 pages.

Jayasenan, et al. "Stateful Network Address Translation Protocol Implemented Over a Data Network", U.S. Appl. No. 09/735,199, filed Dec. 11, 2000.

Luciani et al., "Server Cache Synchronization Protocol (SCSP)", RFC 2334, Network Working Group, Apr. 1998.

Moy, J., OSPF Version 2, RFC 1583, Network Working Group, Mar. 1994.

* cited by examiner

Fig. 7A
⟵ 700

| Router ID | Internal Interface Address | Priority |
|---|---|---|
| 100 | Addr1 | 1 |
| 200 | Addr2 | 2 |
| 300 | Addr3 | 3 |

| Router ID | Internal Interface Address | Priority | Master | Global Address Range Assignment | Global Port Range Assignment |
|---|---|---|---|---|---|
| 100 | Addr1 | 1 | 1 | GA1-GA2 | GP1-GP2 |
| 200 | Addr2 | 2 | 0 | GA3-GA4 | GP3-GP4 |
| 300 | Addr3 | 3 | 0 | GA5-GA6 | GP5-GP6 |

701a ⟶
701b ⟶
701c ⟶

MECHANISMS FOR PROVIDING STATEFUL NAT SUPPORT IN REDUNDANT AND ASYMETRIC ROUTING ENVIRONMENTS

RELATED APPLICATION DATA

The present application is related to U.S. Provisional Patent Application Ser. No. 60/232,152, filed on Sep. 12, 2000, and entitled "Stateful Network Address Translation Protocol Implemented Over a Data Network". That application is incorporated herein by reference in its entirety for all purposes.

The present application is also related to U.S. patent application Ser. No. 09/735,199, filed on Dec. 11, 2000, and naming Jayasenan et al. as inventors. That application is incorporated herein by reference in its entirety for all purposes.

BACKGROUND OF THE INVENTION

1. Field of the Invention

The present invention relates generally to data networks, and more particularly to a technique for implementing asymmetric routing and resource allocation in a network address translation (NAT) environment implemented on a data network.

2. Background

Private networks are commonly connected to the Internet through one or more routers so that hosts (PCs or other arbitrary network entities) on the private network can communicate with nodes on the Internet. Typically, the host will send packets to locations both within its private network and on the Internet. To receive packets from the Internet, a private network or a host on that network must have a globally unique 32-bit IP address. Each such IP address has a four octet format. Typically, humans communicate IP addresses in a dotted decimal format, with each octet written as a decimal integer separated from other octets by decimal points.

Global IP addresses are issued to enterprises by a central authority known as the Internet Assigned Number Authority ("IANA"). The IANA issues such addresses in one of three commonly used classes. Class A IP addresses employ their first octet as a "netid" and their remaining three octets as a "hostid." The netid identifies the enterprise network and the hostid identifies a particular host on that network. As three octets are available for specifying a host, an enterprise having class A addresses has $2^{24}$ (nearly 17 million) addresses at its disposal for use with possible hosts. Thus, even the largest companies vastly under use available class A addresses. Not surprisingly, Class A addresses are issued to only very large entities such as IBM and ATT. Class B addresses employ their first two octets to identify a network (netid) and their second two octets to identify a host (hostid). Thus, an enterprise having class B addresses can use those addresses on approximately 64,000 hosts. Finally, class C addresses employ their first three octets as a netid and their last octet as a hostid. Only 254 host addresses are available to enterprises having a single class C netid.

Unfortunately, there has been such a proliferation of hosts on the Internet, coupled with so many class A and B licenses issued to large entities (who have locked up much address space), that it is now nearly impossible to obtain a class B address. Many organizations now requiring Internet access have far more than 254 hosts—for which unique IP addresses are available with a single class C network address. It is more common for a mid to large size enterprise to have 1000 to 10,000 hosts. Such companies simply can not obtain enough IP addresses for each of their hosts.

To address this problem, a Network Address Translation ("NAT") protocol has been proposed. See K. Egevang and P. Francis, "The IP Network Address Translator (NAT)," RFC 1631, Cray Communications, NTT, May 1994 which is incorporated herein by reference for all purposes. NAT is based on the concept of address reuse by private networks, and operates by mapping the reusable IP addresses of the leaf domain to the globally unique ones required for communication with hosts on the Internet. Further, to implement NAT, a translation system must be provided between the enterprise private network and the Internet. In implementation, a local host wishing to access the Internet receives a temporary IP address from a pool of such addresses available to the enterprise (e.g., Class C 254 addresses). While the host is sending and receiving packets on the Internet, it has a global IP address which is unavailable to any other host. After the host disconnects from the Internet, the enterprise takes back its global IP address and makes it available to other hosts wishing to access outside networks.

FIG. 1 shows a portion of a private network 100. As illustrated in FIG. 1, private network portion 100 includes a plurality of gateway routers (e.g., 104a, 104b) which are configured to perform network address translation for allowing hosts (e.g., H1, H2) or other network devices in the private network to communicate with external nodes (e.g., N1, N2) via a wide area network 110 such as, for example, the Internet.

In the example of FIG. 1, the NAT gateway routers 104a, 104b may be configured as active and standby routers using a Hot Standby Router Protocol (HSRP) such as that described in U.S. Pat. No. 6,108,300, herein incorporated by reference in its entirety for all purposes. The HSRP protocol provides redundancy and fail-over support for the NAT routers 104a, 104b. Thus, for example, if the active NAT router (e.g., NAT1) fails, the standby NAT router (e.g., NAT2) is able to take over the responsibilities of the failed NAT router. As illustrated in the example of FIG. 1, NAT gateway router 104a may be configured as the active gateway router, and NAT gateway router 104b may be configured as the standby gateway route which is configured to take over the functions of the active gateway router 104a during times when the active gateway router is unavailable.

Generally, conventional NAT routers manage and translate address/port information as packets travel from one realm to another. For continuous flows, this translation information is stored in a repository until that flow expires. As applications become more complex, the flow attachment records include additional context sensitive information that may be necessary while the flow is unexpired. Typically, NAT routers record all such information. However, if, for any reason, a NAT router fails or has to be restarted, the translation repository and context information on that router will be lost, thereby isolating the end points and making the flow unrecoverable due to loss of NAT Table information for these flows. As a result, LAN clients which had been using the failed NAT router will have to restart their applications in order to re-establish connectivity to the Internet using an alternate NAT router. Moreover, in most conventional NAT systems, the translation repository or address translation table needs to be continually updated on a per-packet basis. This typically results in thousands of translation updates per second, which makes off-box NAT redundancy updates impractical.

Additionally, communication between internal nodes of the private network and external nodes (i.e., nodes external to the private network) is typically achieved using a symmetric routing protocol whereby all incoming and outgoing packets in to and out from the private network are routed through the active gateway router (e.g., gateway router 104a). One reason for this is that, according to conventional techniques, the active gateway router is designed to be responsible for handling and maintaining all information relating to traffic flows between internal and external nodes. Such information may include, for example, network address translation information, session information, application specific information, timer information (e.g., session timeout information), etc.

It will be appreciated, however, that symmetric routing protocol requirements may result in increased and burdensome traffic loads being imposed upon the active gateway router. Additionally, such symmetric routing protocols may also result in unnecessary routing limitations being imposed upon external gateway routers. Accordingly, it will be appreciated that there exists a continual need to improve upon routing and network address translation mechanisms which are implemented in redundant routing environments in order, for example, to improve traffic flows between public networks and private networks.

SUMMARY OF THE INVENTION

According to different embodiments of the present invention, various methods, systems, and computer program products are described for routing traffic in a data network. The data network includes a public network and a private network. The private network includes a plurality of routers adapted to provide connectivity between nodes in the private network and nodes in the public network. The plurality of routers includes at least one active router adapted to perform network address translation (NAT) for traffic flowing between the public and private networks. The plurality of routers further includes at least one standby router adapted to provide failover capability for the at least one active router. When an ingress-to-egress packet is received at an active router, the active router may perform network address translation on the ingress-to-egress packet, wherein the first packet is associated with a first NAT entry. When an egress-to-ingress packet is received at a standby router, the standby router may perform network address translation on the egress-to-ingress packet.

Various methods, systems, and computer program products of the present invention are also described for enabling asymmetric traffic flow between nodes in the private network and nodes in the public network. In one implementation, the private network includes a plurality of routers adapted to provide connectivity between nodes in the private network and nodes in the public network. The plurality of routers includes at least one active router adapted to perform network address translation (NAT) for traffic flowing between the public and private networks. The plurality of routers further includes at least one standby router adapted to provide failover capability for the at least one active router. At least a portion of ingress-to-egress traffic flowing out from the private network is processed by an active router, and at least a portion of egress-to-ingress traffic flowing in to the private network is processed by a standby router.

Other methods, systems, and computer program products of the present invention are described for routing traffic in a data network. The data network includes a public network and a private network. The private network includes a plurality of routers adapted to provide connectivity between nodes in the private network and nodes in the public network. The plurality of routers includes at least one active router adapted to perform network address translation (NAT) for traffic flowing between the public and private networks. The plurality of routers further includes at least one standby router adapted to provide failover capability for the at least one active router. A packet is received at a first router in the private network. The packet is associated with a flow between a private network node and a public network node. The flow is associated with a first NAT entry. A timeout timer associated with the first NAT entry is started at the first router. When the timeout time expires, a Delete Query message to one or more other routers in the private network. According to a specific implementation, the Delete Query message is used to query the other router for selected information relating to the first NAT entry. According to a specific embodiment, one or more of the other routers in the private network may respond to the Delete Query message by sending a Delete Response message back to the first router. The Delete Response message may include information relating to the first NAT entry which may be used to determine actions to be performed on the first NAT entry such as, for example, whether to delete first NAT entry, whether to restart the timeout time associated with the first NAT entry, etc.

Further methods, systems, and computer program products of the present invention are described for routing traffic in a data network. The data network includes a public network and a private network. The private network includes a plurality of routers adapted to provide connectivity between nodes in the private network and nodes in the public network. The plurality of routers includes at least one active router adapted to perform network address translation (NAT) for traffic flowing between the public and private networks. The plurality of routers further includes at least one standby router adapted to provide failover capability for the at least one active router. A packet is received at a first router in the private network.

A packet is received at a first router in the private network. The packet is associated with a flow between a private network node and a public network node. The flow is associated with a first NAT entry. A first timestamp value relating to a time when the first packet was received is recorded at the first router. The first NAT entry may then be updated with the first timestamp value. According to a specific implementation, the first router may correspond to a standby router which is currently operating in a standby mode of operation.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIGS. 7A and 7B illustrate different embodiments of a Peer Resource Assignment Table which may be generated using a technique of the present invention.

DETAILED DESCRIPTION OF THE PREFERRED EMBODIMENTS

The present invention describes various techniques which may be used for improving traffic flows between private networks and public networks. According to one aspect of the present invention, a technique is described for implementing asymmetric routing in a NAT routing environment. For example, according to one implementation, ingress-to-egress traffic (i.e., traffic which flows from inside the private network to outside the public network) may be handled by an HSRP active NAT gateway router, and egress-to-ingress traffic (e.g., traffic flowing from the public network into the private network) may be handled by either the active NAT router or the standby NAT router, depending upon routing considerations implemented at routing devices external to the private network. Due to this possibility of asymmetry in routing, one embodiment of the present invention provides a mechanism for the active and standby NAT routers to update each other about application specific changes in selected traffic flows, as well as providing a mechanism for each of the routers to manage timer information relating to NAT entries, and their associated traffic flows.

Another aspect of the present invention provides a technique for implementing load balancing and resource allocation assignments among peers in a redundant, multiple NAT router environment. For example, according to one implementation, a modified HSRP protocol may be used for implement redundancy and load balancing among multiple NAT routers, wherein selected NAT routers may be configured to function as active NAT routers for specific address groups, and configured to function as standby NAT routers for other address groups. According to a specific embodiment, the plurality of NAT routers may be referred to as peers since any of the NAT routers may be configured to take over the functionality of any of the other NAT routers in case of failovers. Additionally, according to a specific embodiment, each of the peer NAT routers may be configured to share common NAT resources such as, for example, global address and global port assignments from a common NAT pool. In such an embodiment, a mechanism may be provided to allocate specific address and port ranges to each peer NAT device, and to enable each of the peer NAT devices to provide resource allocation updates and/or stateful NAT information to the other peer devices.

Figure 1:
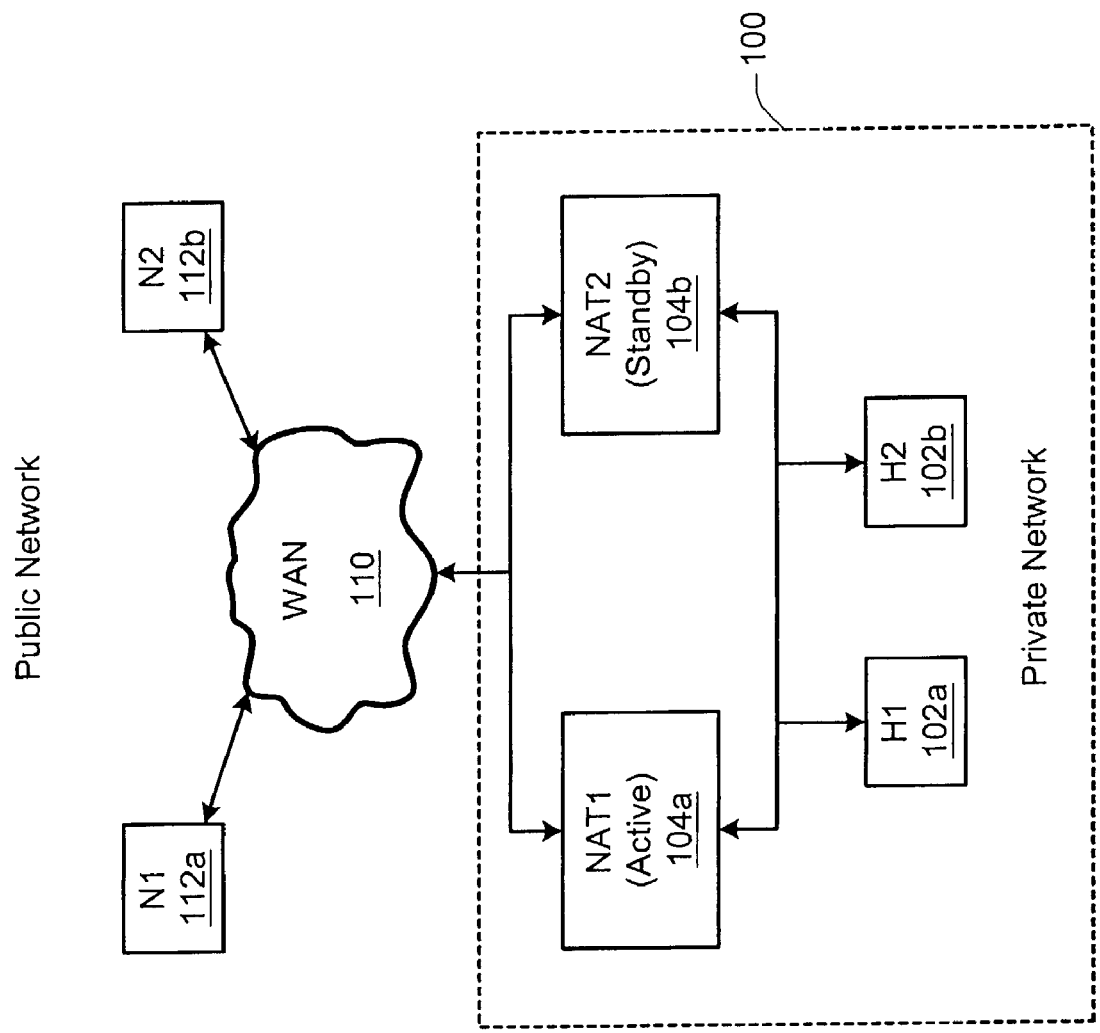
FIG. 1 shows a portion of a private network 100.

According to a specific embodiment of the present invention, asymmetric traffic flow may be implemented in a redundant NAT router environment such as that illustrated in FIG. 1. According to one implementation, ingress-to-egress traffic may be routed through the active NAT router (e.g., NAT1 104a), and egress-to-ingress traffic may be routed through either the active NAT router 104a or the standby NAT router (e.g., NAT2 104b). The active NAT router may be configured to distribute NAT entry information, stateful NAT information and/or NAT application specific information (such as, for example, sequence delta(Δ) information, session information, etc.) to the standby NAT router. In this way, asymmetric routing may be enabled, whereby ingress-to-egress traffic may be routed through the active NAT router, and at least a portion of the egress-to-ingress traffic may be routed through the standby NAT router. Using the information provided from the active NAT router 104a, the standby NAT router 104b is able to modify application specific information of inbound packets as well as perform any necessary NAT translations.

It will be appreciated that, because of the dynamic nature of the NAT entries, each NAT entry may have one or more timeout values associated therewith. According to a specific implementation, the active NAT router may be used to handle timing issues associated with each NAT entry such as, for example, the starting and/or stopping of specific timers associated with specific NAT entries. According to one implementation, the responsibility of the active NAT router for handling NAT entry timer issues may be independent from the entity which created the NAT entry.

Figure 2:
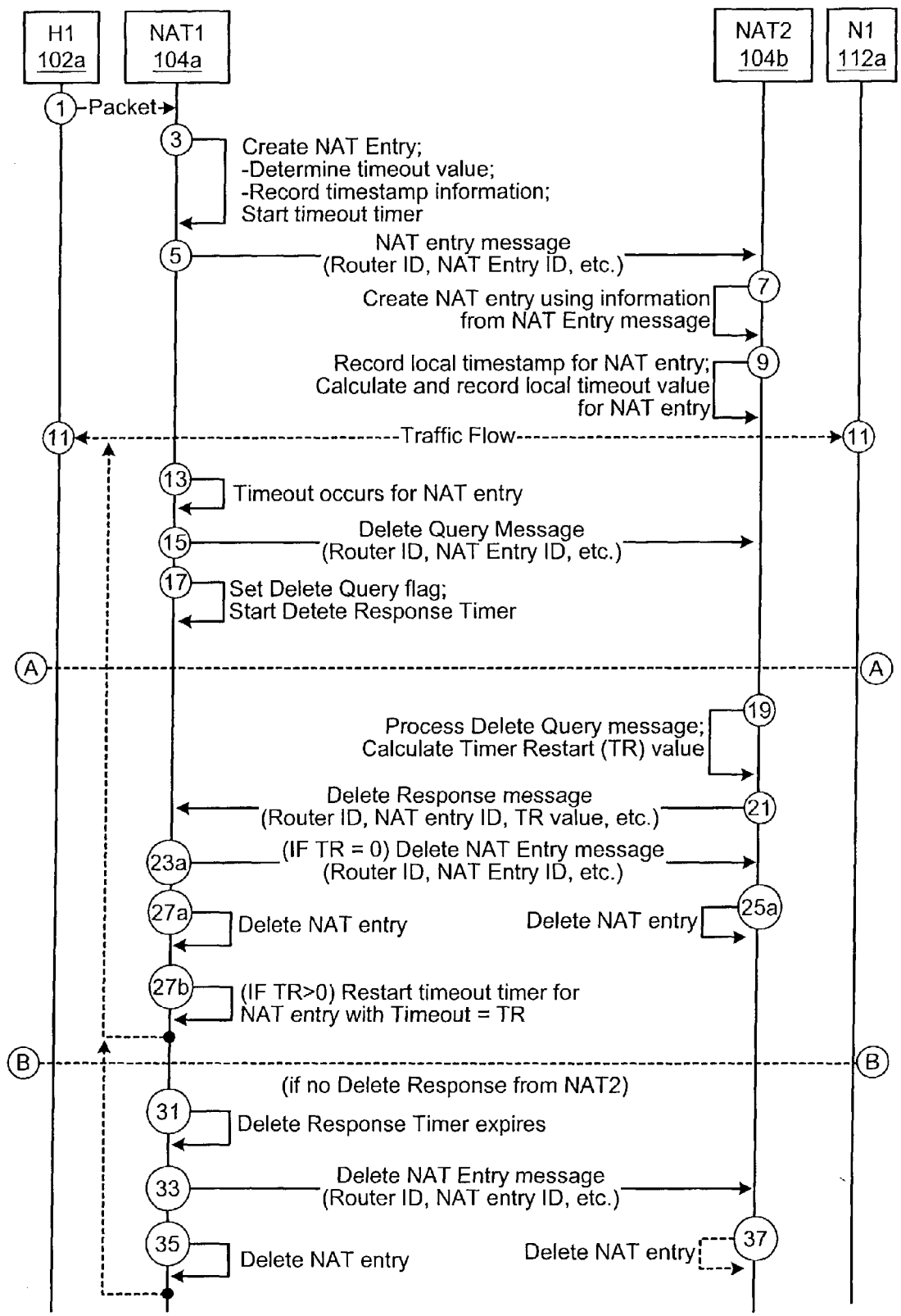
FIG. 2 shows a specific embodiment of a NAT Entry Management Flow which may be used for implementing various aspects of the present invention.

FIG. 2 shows a specific embodiment of a NAT Entry Management Flow which may be used for implementing various aspects of the present invention. For purposes of illustration, it is assumed that the NAT Entry Management Flow is implemented at the network portion illustrated in FIG. 1. Initially, it is assumed that an ingress-to-egress packet is sent (1) from a node inside the private network (e.g., H1 102a) to a node external to the private network (e.g., N1 112a). Because the active NAT router is configured to handle all ingress-to-egress traffic, the packet is received at the active NAT router (e.g., NAT1 104a). In the example of FIG. 2, it is assumed that the received packet corresponds to a new traffic flow between a node H1 and node N1. Accordingly, the active NAT router creates (3) a NAT entry for the traffic flow associated with the received packet. At least a portion of the information contained in the NAT entry may include, for example, network address translation information, session information, application specific information, etc. Other information which may be included in the NAT entry is described in IETF RFC 1631, and is commonly known to one having ordinary skill in the art.

During creation of the NAT entry, NAT1 may determine a timeout value for the NAT entry. According to a specific embodiment, a timeout value may be calculated or determined using configuration information and/or other information stored locally at the NAT1 router. In one implementation, a timeout value may be determined by adding a predetermined Time To Live (TTL) value or Δ value to a current, local time stamp value in order to arrive at a future timeout value which represents a time at which the NAT entry will be deemed to have expired. This calculation may be expressed according to the following equation:

$$\text{Timeout(NAT Entry)} = TS + TTL, \quad (1)$$

where TS represents a local timestamp value corresponding to a time when the NAT entry was created, and TTL represents a predetermined "time to live" value associated with that NAT entry.

Additionally, during creation of the NAT entry, the local timestamp value TS may be recorded and stored in a field of the NAT entry such as, for example, a "used timestamp" field. It is noted that, although conventional NAT entries include such a used timestamp field, this field is traditionally not used for any purpose by conventional NAT protocols.

After the timeout value has been determined for the NAT entry, the active NAT router may then start a timeout timer associated with the created NAT entry. According to one embodiment, the timeout timer may be implemented as a register or counter into which the timeout value is preloaded. After the timeout timer has been started, it may then decrement its current "timeout" value at each clock cycle. In this embodiment, expiration of the timeout timer may occur when the value of the timer reaches zero.

According to a specific implementation, the NAT entry may have associated with it a NAT Entry ID, and a Router ID corresponding to the NAT router which created the NAT entry. Periodically, after one or more NAT entries have been created, the active NAT router 104a may send (5) one or more NAT Entry messages to the standby router 104b. Thus, for example, as illustrated in FIG. 2, after creating the NAT entry at (3), the active NAT router 104a sends (5) a NAT Entry message to the NAT standby router 104b, which includes information relating to the Router ID and NAT Entry ID associated with the newly created NAT entry.

Upon receiving the NAT Entry message, the standby NAT router 104b creates (7) a NAT entry in its local NAT Table using information from the received NAT Entry message. Additionally, a current local timestamp value may be recorded (9) and stored locally at the standby NAT router. In one implementation, timestamp information relating to the created NAT entry may be stored in a field of the NAT entry which is stored at the local NAT Table. Using the local timestamp value, the standby NAT device may also calculate and record a local timeout value for the NAT entry. According to a specific embodiment, calculation of the local timeout value may be implemented in a manner similar to that described with respect to Equation (1) above. Thereafter, as shown at (11), traffic flow may continue between internal node H1 and external node N1.

Figure 3:
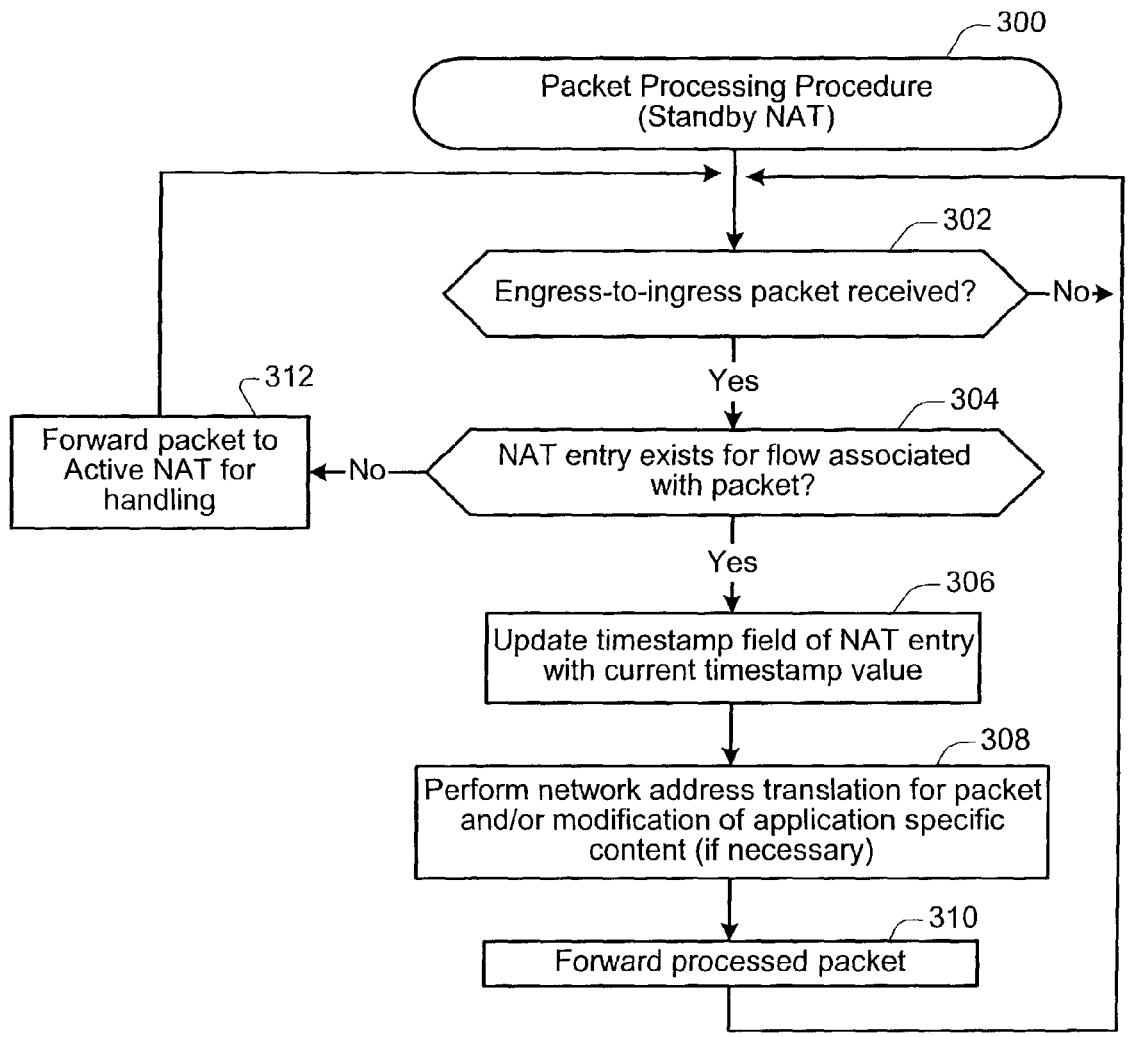
FIGS. 3 and 4 illustrate various flow diagrams which may be implemented at the active and standby NAT routers for handling traffic flows in accordance with a specific embodiment of the present invention.
Figure 4:
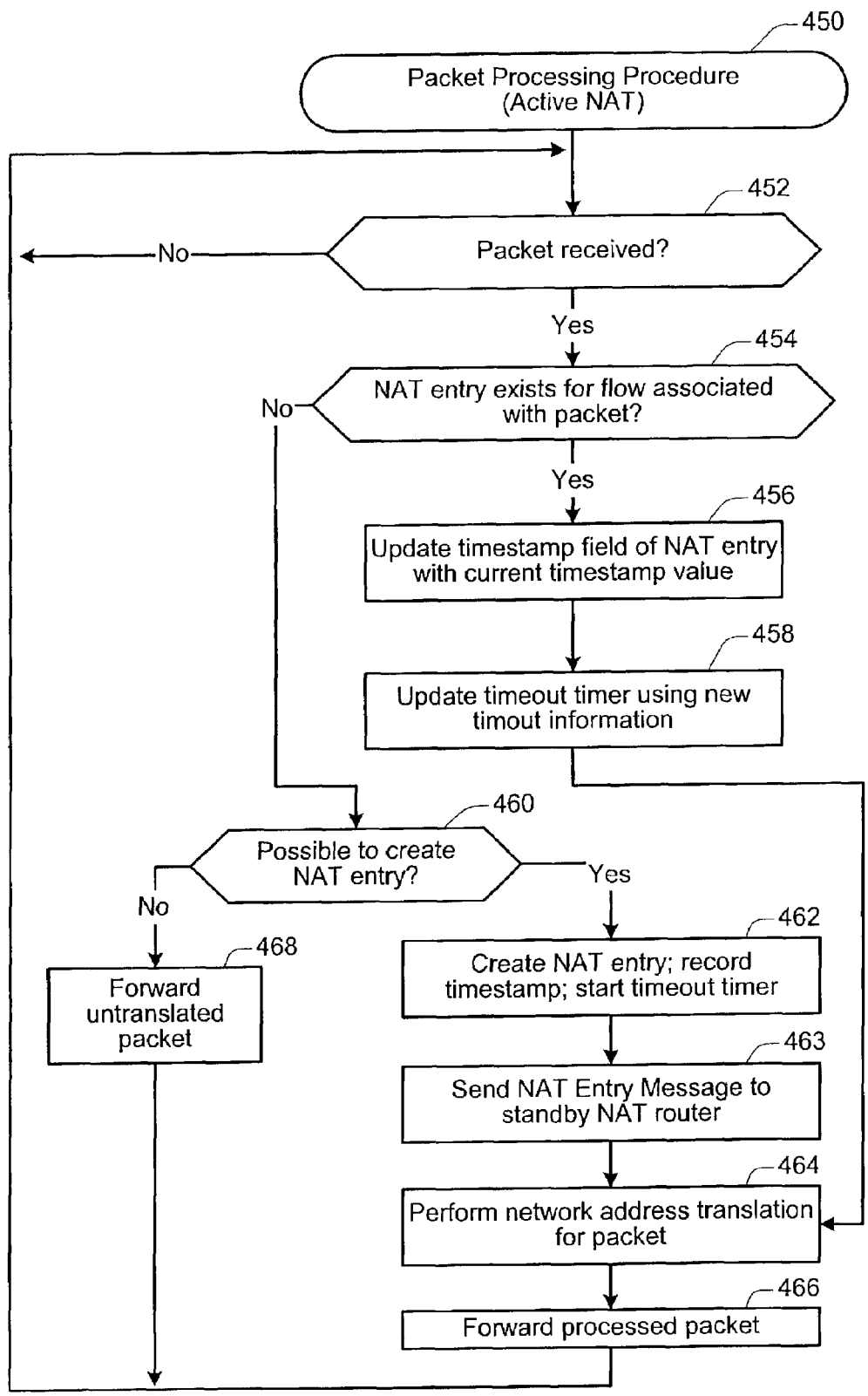

FIGS. 3 and 4 illustrate various flow diagrams which may be implemented at the active and standby NAT routers for handling traffic flows in accordance with a specific embodiment of the present invention. More specifically, FIG. 3 illustrates a specific embodiment of an Packet Processing Procedure 300 which may be implemented, for example, at the standby NAT router 104b of FIG. 1. When an egress-to-ingress packet is received (302) at the standby NAT router, a determination is made (304) as to whether a NAT entry exists (in the local NAT Table) for the flow associated with the egress-to-ingress packet. If no NAT entry exists, the packet may be forwarded (312) to the active NAT router for handling.

Assuming, however, that a NAT entry does exist, the timestamp field of the NAT entry is updated (306) with a current local timestamp value. As described in greater detail below, this updated timestamp information may be subsequently used to modify the timeout timer value for the NAT entry, which is maintained by the active NAT router 104a.

As shown at 308, the standby NAT router also performs any necessary network address translation and/or modification of application specific information for the packet before forwarding the packet to its final destination. Thereafter, the processed packet may then be forwarded (310) to its final destination inside the private network.

FIG. 4 shows a specific embodiment of a Packet Processing Procedure 450 which may be implemented at an active NAT router such as, for example, active NAT router 104a of FIG. 1. When a packet is received (452) at the active NAT router 104a, a determination is made (454) as to whether a NAT entry currently exists (in the local NAT Table) for the flow associated with the received packet. If it is determined that a NAT entry does not exist, a determination is then made (460) as to whether it is possible to create a NAT entry for the packet flow. If it is not possible to create a NAT entry for the packet, the untranslated packet may be forwarded (468) to its final destination. If, however, it is possible to create a NAT entry for the packet, a NAT entry for the packet flow is created (462). During creation of the NAT entry, a current local timestamp value may be recorded and stored in the NAT entry, and a timeout timer associated with the NAT entry may be started. Additionally, a NAT Entry Message may be generated and sent (463) to the standby NAT router, informing the standby NAT router of the creation of the NAT entry. After any necessary network translation and/or modification of application specific information for the packet has been performed (464), the processed packet may then be forwarded (466) to its final destination.

Returning to 454, if it is determined that a NAT entry does exist for the packet flow, the active NAT router 104a may then update (456) the timestamp field of the NAT entry with a new, current local timestamp value.

Additionally, the timeout timer associated with the NAT entry may be updated or restarted (458) using newly determined timeout information which may be calculated, for example, using the new, current timestamp value. Thereafter, any necessary network translation and/or modification of application specific information for the packet may be performed (464), and the processed packet may then be forwarded (466) to its final destination.

According to a specific implementation, the updating of the timeout timer may result in an extension of the life of the NAT entry associated with the packet flow. Thus, for example, each time a packet (associated with a particular NAT entry) is received at either of the active NAT router or the standby NAT router, the timeout value of the timeout timer associated with the NAT entry (which is managed by the active NAT router) may (eventually) be updated to extend the life of that particular NAT entry. Aspects of this feature are described in greater detail below, for example, with respect to FIG. 2 of the drawings.

Returning now to FIG. 2, at (13) it is assumed that a timeout occurs for a specific NAT entry. According to conventional techniques, when the active NAT router detects that a timeout has occurred for a given NAT entry, the active NAT router will respond by automatically deleting the expired NAT entry. However, in accordance with a specific embodiment of the present invention as shown, for example, in FIG. 2, when the active NAT router detects that a timeout has occurred for a particular NAT entry, the active NAT router may respond by sending (15) a Delete Query message to the standby NAT router. According to one implementation, the Delete Query message may include information relating to the expired NAT entry such as, for example, the Router ID and NAT Entry ID associated with that NAT entry.

Additionally, as shown at (17), the active NAT router may start a Delete Response Timer, and set a Delete Query flag in a local data structure. According to a specific implementation, the Delete Query flag may be used as a record to indicate that a Delete Query message for the expired NAT entry was (or was not) sent to the standby NAT router. Additionally, the Delete Response Timer may be used as a timeout mechanism for handling the expired NAT entry in the event that the standby NAT router does not respond to the Delete Query message. According to a specific implementation, the Delete Response Timer may be set to a value ranging, for example, from several seconds to several minutes.

As illustrated in the embodiment of FIG. 2, the actions which the active NAT router may perform in response to detecting an expired NAT entry may depend upon a variety of factors such as, for example, whether the standby NAT router replies to the Delete Query message, and, assuming that a response was sent, the information contained within the response to the Delete Query message. For purposes of illustration, each of these different scenarios will be described by way of example using the flow illustrated in FIG. 2.

In a first example, the sequence of events 19-27b which occur after reference point A correspond to situations where the standby NAT router 104b receives the Delete Query message for the expired NAT entry, and generates and sends a delete response message to the active NAT router. In this example it is assumed that the standby NAT router 104b is working properly and has received the Delete Query message sent from the active NAT router 104a. When the standby NAT router 104b receives a Delete Query message for the expired NAT entry, the standby NAT router may process (19) the Delete Query message and may also calculate a Timer Restart (TR) value associated with the NAT Entry identified in the Delete Query message.

As described previously at (9), a standby NAT router calculates a local timeout value on creation of a local NAT entry which may be stored, for example, in a field of the NAT entry. According to a specific embodiment, as egress-to-ingress packets are received at the standby NAT router, the timestamp field of the NAT entry may be updated with a current local timestamp value. However, the timeout value may or may not be updated at that time. According to a specific implementation, calculation of the Timer Restart (TR) value by the standby NAT router for the expired NAT entry may be achieved via the following equation:

$$\text{Timer Restart(TR)}=TS-TO-TTL, \quad (2)$$

where TS represents the timestamp value currently stored in the NAT entry, TO represents the calculated timeout value for the NAT entry, and TTL represents a predetermined or preconfigured "time to live" value. As described previously, the timeout (TO) value may be initially calculated at the standby NAT router by adding the TTL value to a timestamp value corresponding to about the time in which the NAT entry was created at the standby NAT router. Thus, another formula which may be used for calculating the Timer Restart value is:

$$\text{Timer Restart(TR)}=TS2-TS1, \quad (3)$$

where TS2 represents the timestamp value currently stored in the NAT entry, and TS1 represents the timestamp value corresponding to about the time in which the NAT entry was created at the standby NAT router.

Thus, for example, if the standby NAT router has not processed any egress-to-ingress packets relating to the expired NAT entry (during the time period when the NAT entry was still alive), the Timer Restart value will be TR=0. However, if the standby NAT router has processed one or more packets relating to the expired NAT entry (during the time period when the NAT entry was still alive), the Timer Restart value for the NAT entry will be a value greater than zero since, for example, TS2 will be greater than TS1.

In response to receiving a Delete Query message from the active NAT router, the standby NAT router may generate and send (21) a Delete Response message to the active NAT router 104a. According to one implementation, the Delete Response message may include information copied from the Delete Query message such as, for example, a Router ID, a NAT Entry ID, etc., and may also include the Timer Restart value which is calculated at the standby NAT router. As shown at (23a), if the Timer Restart value from the Delete Response message is equal to zero, then it may be assumed that the local timeout timer for the expired NAT entry (at the active NAT router) does not need to be modified, and that the expired NAT entry may be deleted. Accordingly, the active NAT router may generate and send (23a) a Delete NAT Entry message to the standby NAT router 104b. Thereafter, the active NAT router may delete (27a) the expired NAT entry from its local NAT Table. When the standby NAT router 104b receives the Delete NAT Entry message, it may also delete the NAT entry (identified by the Delete NAT Entry message) from its local NAT Table.

Alternatively, if the Timer Restart value provided in the Delete Response message (at 21) is greater than zero, then it may be assumed that the life of the expired NAT entry is to be extended by an additional time period. Accordingly, in one embodiment, the active NAT router may restart (23b) the timeout timer corresponding to the expired NAT entry so that the life of the NAT entry is extended by an additional time period. Thereafter, the NAT entry (e.g., corresponding to the traffic flow between device H1 102a and device N1 112a) will remain alive and/or active until expiration of the timeout timer occurs again for that NAT entry. According to one implementation, the additional time period may be calculated using the Timer Restart information provided in the Delete Response message. For example, in one embodiment, the additional time period may be about equal to a length of time corresponding to the Timer Restart value.

It will be appreciated that, according to different embodiments, the standby NAT router 104b may be configured to not send a Delete Response message, for example, if it is determined that the Timer Restart value for the expired NAT entry is not greater than zero. In such an embodiment, the expired NAT entry will automatically be deleted at the active NAT router 104a upon expiration of the Delete Response Timer, as described in greater detail below.

In the event that no delete response is received from the standby NAT router (as shown at reference point B of FIG. 2) the Delete Response Timer at the active NAT router will eventually expire (31). After expiration of the Delete Response Timer, the active NAT router may generate and send a Delete NAT Entry message (33) to the standby NAT router. Thereafter, the active NAT router may delete (35) the expired NAT entry from the local NAT Table. It will be appreciated that the various aspects of the present invention which are described, for example, in FIGS. 2, 3A, and 3B of the drawings provide the ability for asymmetric traffic flow to occur between internal nodes of a private network and nodes external to the private network, whereby egress-to-ingress packets (e.g., packets sent from nodes external to the private network to nodes internal to the private network) may be routed through different gateway routers in the private network. However, in some embodiments, such as that illustrated in FIG. 1 of the drawings, ingress-to-egress packets (e.g., packets which are sent from source nodes internal to the private network to destination nodes external to the private network) are only routed through the active NAT gateway router of the private network (e.g., 104a).

Figure 5:
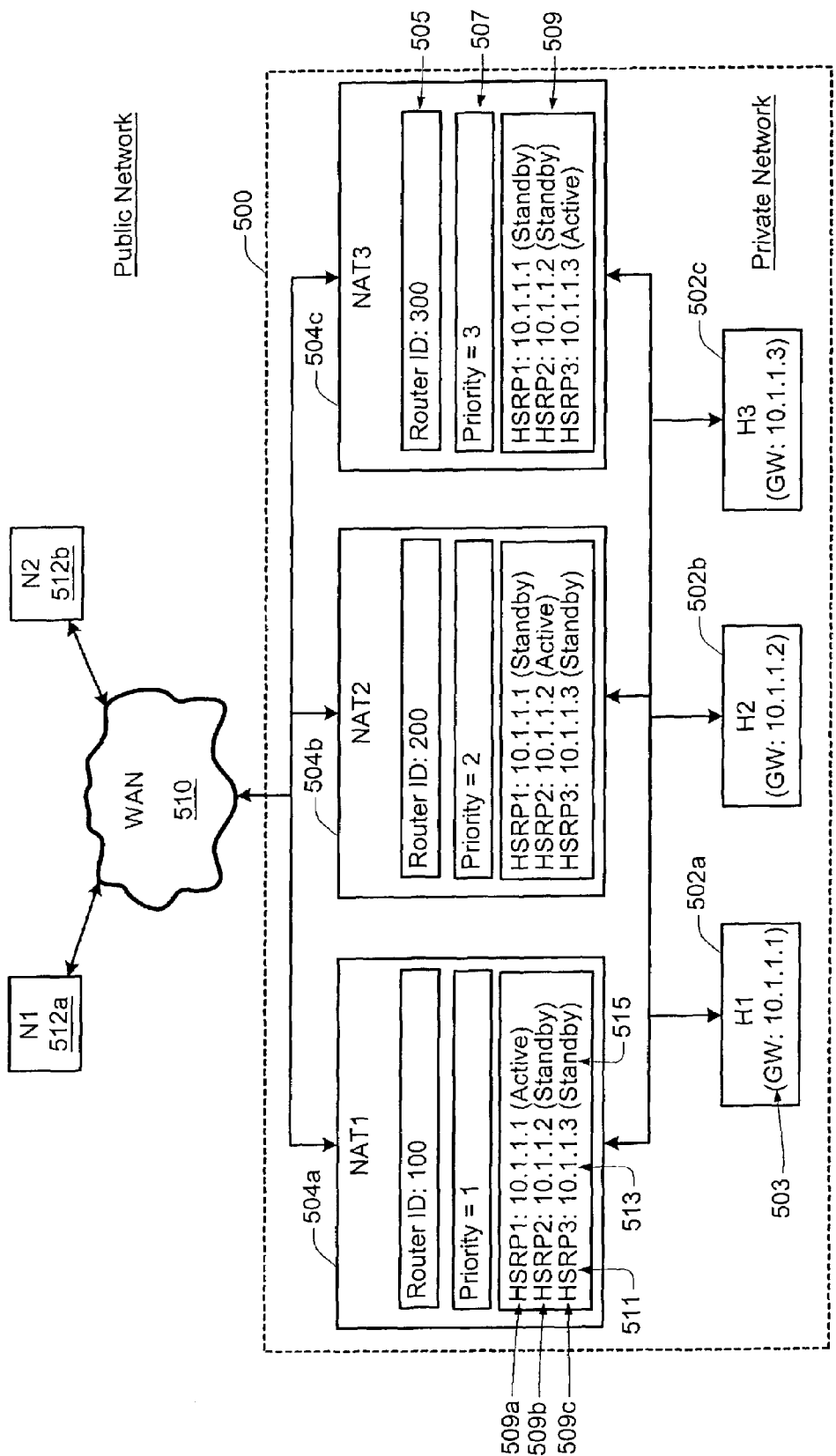
FIG. 5 shows an alternate embodiment of a private network 500 which may be configured to provide asymmetric traffic flow for both egress-to-ingress packets and ingress-to-egress packets.

FIG. 5 shows an alternate embodiment of a private network 500 which may be configured to provide asymmetric traffic flow for both egress-to-ingress packets and ingress-to-egress packets. As shown in FIG. 5, the private network 500 includes a plurality of peer NAT routing devices 504a, 504b, 504c which are each configured to take over the functionality of one or more of the other peer NAT routers in case of failovers or other reasons. Each peer NAT router 504 is configured to have a unique Router ID 505, and an associated priority value 507.

Additionally, as shown in FIG. 5, each of the peer NAT routers 504 (also referred to as "peers") may be configured to implement a plurality of different HSRP groups 509. Each different HSRP group may be associated with one or more virtual IP address(es) (513) within the private network. For example, as illustrated in the example of FIG. 5, HSRP Group 1 (509*a*) may be associated with virtual IP address 10.1.1.1; HSRP Group 2 (509*b*) may be associated with virtual IP address 10.1.1.2; and HSRP Group 3 (509*c*) may be associated with virtual IP address 10.1.1.4.

As illustrated in the embodiment of FIG. 5, each of the peer NAT routers may be configured to function as an active NAT router for one or more HSRP Groups, and may be configured to function as a standby NAT router for one or more of the other HSRP Groups. For example, as illustrated in the example of FIG. 5, peer NAT router 504*a* is configured to function as the active NAT router for HSRP Group 1 509*a*, and is configured to function as a standby NAT router for HSRP Groups 2 and 3 (509*b*, 509*c*). Peer NAT router 504*b* is configured to serve as the active NAT router for HSRP Group 2 509*b*, and is configured to serve as a standby NAT router for HSRP Groups 1 and 3. Peer NAT router 504*c* is configured to serve as the active NAT router for HSRP Group 3 509*c*, and is configured to serve as a standby NAT router for HSRP Groups 1 and 2.

Each host or node (e.g., 502*a*, 502*b*, 502*c*) within the private network may be configured to utilize a particular virtual IP address as its primary gateway 503. Such information may be stored, for example, as configuration information at each of the respective host devices. For example, as shown in FIG. 5, host 502*a* is configured to utilize virtual IP address 10.1.1.1 as its primary gateway, whereas host 502*b* is configured to utilize virtual IP address 10.1.1.2 as its primary gateway address. Since peer NAT router 504*a* is configured to function as the active NAT router for virtual IP address 10.1.1.1, and peer NAT router 504*b* is configured to serve as the active NAT router for virtual IP address 10.1.1.2, ingress-to-egress traffic sent from host device 502*a* will be routed through peer NAT router 504*a*, whereas ingress-to-egress traffic sent from host 502*b* will be routed to peer NAT router 504*b*. In this way, load balancing of ingress-to-egress traffic flows may be achieved in a NAT environment. Moreover, utilizing the private network implementation illustrated in FIG. 5, bi-directional asymmetric routing may be achieved for both egress-to-ingress traffic and ingress-to-egress traffic.

In order to implement traffic load balancing techniques as illustrated in FIG. 5, it is preferable that there exists some mechanism for providing resource sharing and/or resource allocation assignments among the various peer NAT routers. For example, according to one implementation, each peer NAT router may be assigned a different range of addresses and ports from a common NAT pool to be used for performing NAT operations handled by that peer NAT router. According to one implementation, the NAT resources (e.g., global address ranges, global port ranges) may be statically provisioned to each of the peer NAT routers as part of the local configuration information stored at each peer NAT router. In an alternate implementation, each of the peer NAT devices may be dynamically assigned or allocated NAT resources from a common NAT pool.

Figure 6A:
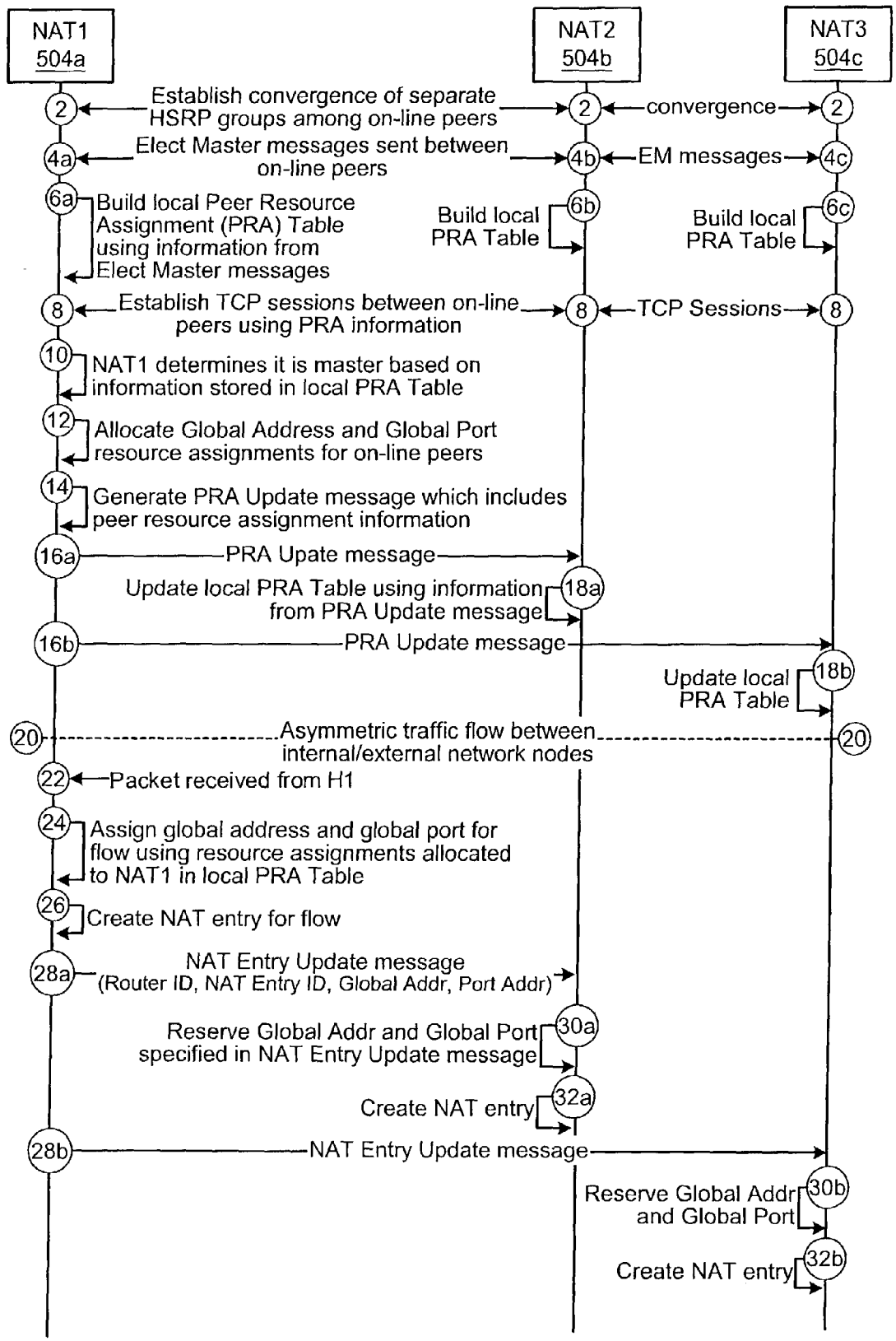
FIGS. 6A-6C illustrate a technique for providing NAT resource allocation among peer NAT routers in a private network in accordance with a specific embodiment of the present invention.
Figure 6B:
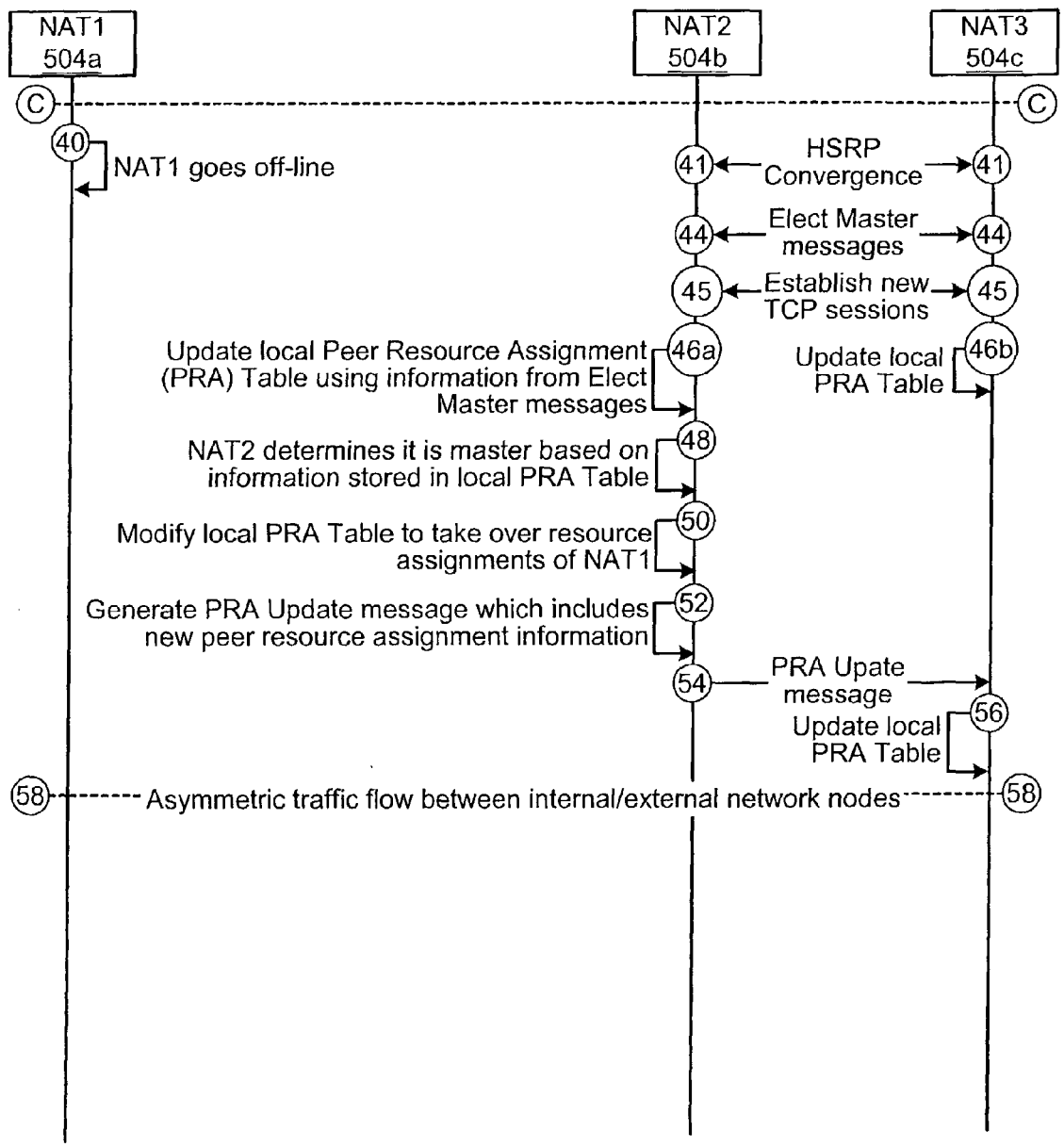
Figure 6C:
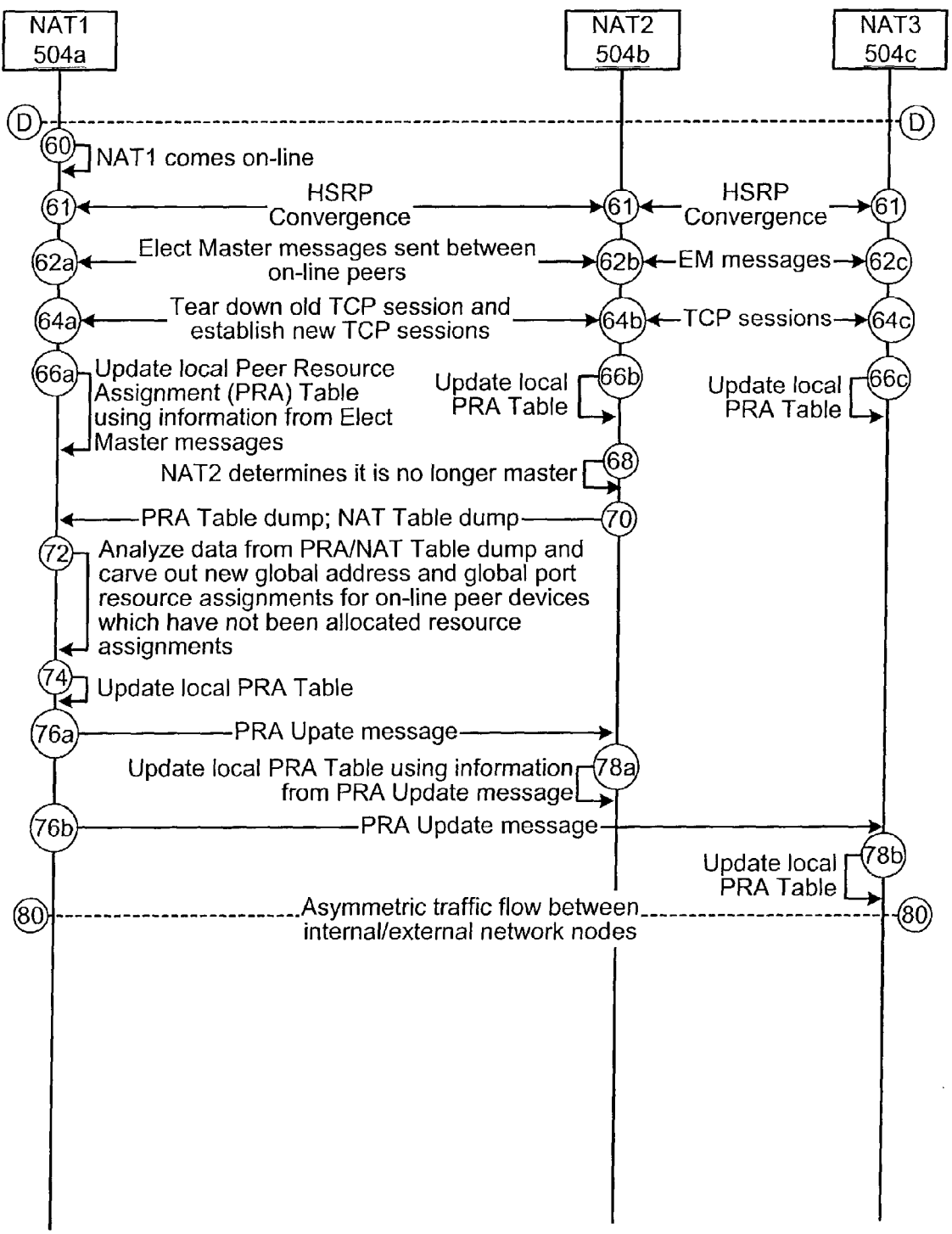

FIGS. 6A-6C illustrate a technique for providing NAT resource allocation among peer NAT routers in a private network in accordance with a specific embodiment of the present invention. Using the technique illustrated in FIGS. 6A-6C of the drawings, load sharing and redundancy may be implemented between peer NAT routers in a manner which allows the peer NAT routers to share resources from the same NAT pool. For purposes of illustration, the NAT resource allocation technique of FIGS. 6A-6C will be described with respect to the private network 500 illustrated in FIG. 5 of the drawings. It will be appreciated, however, that the NAT resource allocation technique illustrated in FIGS. 6A-6C may be modified for implementation in other private network configurations which are different from that illustrated in FIG. 5. Such modifications will generally be known to one having ordinary skill in the art. For example, in the example of FIG. 5, the private network 500 is shown to include 3 peer NAT routers, namely, NAT1 504*a*, NAT2 504*b*, NAT3 504*c*. Of course, other private networks may include a different number of peer NAT routers than that illustrated in FIG. 5.

Initially, as shown at (2) of FIG. 6A, convergence of the separate HSRP Groups is established among all (or selected ones) of the on-line peer NAT routers (herein referred to as "peers"). In one implementation, convergence of the separate HSRP Groups may be established using configuration information which is stored locally at each peer. According to a specific embodiment, convergence of the separate HSRP Groups may be established when each on-line peer is aware of its own active and/or standby assignments relating to each of the separate HSRP Groups. In the present example, it is assumed that the convergence of the separate HSRP Groups among the on-line peers 504*a*, 504*b*, 504*c* has been established in accordance with the implementation illustrated in FIG. 5.

Each peer may then generate and send (4*a*, 4*b*, 4*c*) an Elect Master message to the other on-line peers. According to a specific implementation, the Elect Master messages may be configured as a broadcast-type messages which are multicast to the other on-line peers (e.g., via UDP). In one implementation, an Elect Master message which is generated by a particular peer NAT router (e.g., NAT1 504*a*) may include information relating to various parameters such as, for example, the Router ID of the peer, the IP address (e.g., internal interface address) of the peer, the priority value associated with the peer, etc. The time period during which each peer sends and receives Elect Master messages to/from other peers may be referred to as an "elect master convergence interval". At the end of the elect master convergence interval, each peer may use the information from the Elect Master messages which it received from the other peers to build (6*a*, 6*b*, 6*c*) a local Peer Resource Assignment (PRA) Table. An example of a local peer resource assignment table which has been generated using information from the Elect Master messages is illustrated in FIG. 7A.

As shown in the embodiment of FIG. 7A, the Peer Resource Assignment Table 700 may include separate entries (e.g., 701*a*, 701*b*, 701*c*) corresponding to each (or selected ones) of the on-line peers 504*a*, 504*b*, 504*c*. Each entry in the Peer Resource Assignment Table includes information relating to a different on-line peer such as, for example, Router ID information 702, internal interface address information 704, priority information 706, etc. In the present example, each of the on-line peers 504*a*, 504*b*, 504*c* may build a local Peer Resource Assignment Table which includes at least a portion of the information illustrated in table 700 of FIG. 7A.

Once an initial Peer Resource Assignment Table has been populated at one or more on-line peers, TCP sessions between the on-line peers may then be established (8) using the information contained in the Peer Resource Assignment Table. Additionally, as shown at (10), one of the on-line peers will determine that it is the master peer based on information stored in its local PRA table.

According to different implementations, the master peer may be selected based on the priority information associated with each peer. For example, in the embodiment of FIG. 5, the master peer may be designated as the on-line peer which currently has the lowest associated priority value. Accordingly, each of the on-line peers will recognize peer 504a as the master since peer 504a has the relatively lowest priority value. According to one implementation, a separate field or flag bit (e.g. 708) may be used in the Peer Resource Assignment Table to indicate which peer is the current master.

In the present example, once NAT1 determines that it is the master, it may then allocate (12) global address and global port resource assignments for each of the on-line peers. According to at least one implementation, the global address and global port resource assignments which are assigned to a given on-line peer may include a global address range and a global port range which are reserved for use by that peer in performing local NAT operations. Additionally, according to at least one implementation, the global address and global port resource assignments may be allocated from a single or common NAT pool which is shared among all (or a selected portion of) the peers.

After the master peer has allocated global address and global port resource assignments for each of the on-line peers, it may then generate (14) one or more Peer Resource Assignment (PRA) Update messages which include the peer resource assignments allocated by the master peer. The PRA Update messages are then sent (16a, 16b) from the master peer to the other on-line peers. According to a specific embodiment, the PRA Update messages may be sent to one or more of the other peers using existing TCP session channels. When the other peers receive a PRA Update message, each peer may update (18a, 18b) its local PRA Table using information from the received PRA Update message(s). An example of an updated PRA Table is illustrated in FIG. 7B of the drawings.

As shown in FIG. 7B, the updated Peer Resource Assignment Table 750 may include additional information relating to each on-line peer device such as, for example, current master information 708, global address information (e.g., global address ranges) 710 allocated to each respective on-line peer, global port information (e.g., global port ranges) 712 allocated to each respective on-line peer, etc. According to a specific implementation, the updated PRA Table stored locally at each on-line peer may include the global address and global port resource assignments associated with the other on-line peers so that each peer is aware of the different global address ranges and global port ranges allocated to each of the other on-line peers.

Thereafter, as shown at (20), asymmetric traffic flow may commence between internal and external network nodes, for example, in a manner such as that described previously with respect to FIG. 5. Thus, for example, if host H1 502a sends a packet to an external network node such as N1 512a, the packet will be routed through gateway router NAT1 504a (since H1's primary gateway address is 10.1.1.1, and NAT1 is designated as the active gateway router for virtual address 10.1.1.1). When the packet from H1 is received (22) at NAT1, NAT1, acting as the active NAT router for HSRP Group 1, will assign a global address and a global port for the traffic flow associated with the received packet using the NAT resource assignments which have been allocated to NAT1 (such resource assignments may be stored, for example, in NAT1's PRA Table). A NAT entry for the flow associated with the received packet may then be created (26) at NAT1. In a specific implementation, the created NAT entry will include information relating to the global address and global port assigned by NAT1 to that particular flow. After creation of the NAT entry, NAT1 may then generate and send (28a, 28b) a NAT Entry Update message to each of the other on-line peer NAT routers, informing the other peers of the newly created NAT entry. In one implementation, the NAT Entry Update message may include information related to the newly created NAT entry such as, for example, the Router ID associated with the peer which created the NAT entry, the NAT Entry ID, global address information, global port information, etc. According to a specific embodiment, when the other on-line peers receive the NAT Entry Update message, each of the on-line peers may reserve (30a, 30b) the global address and global port values specified in the NAT Entry Update message. In this way that the reserved global address and global port values are prevented from being assigned to other packet flows. Additionally, upon receiving the NAT Entry Update message, each of the on-line peers may create (32a, 32b) a NAT entry in its local NAT Table, and populate the entry with information obtained from the NAT Entry Update message.

Each time an ingress-to-egress packet is received at one of the peer NAT routers, a process similar to that described in operations 22-32b of FIG. 6A may be performed, wherein the peer which receives the outbound packet uses its assigned NAT resources to assign a global address and global port for the flow associated with the received packet; creates a NAT entry in its local NAT Table for the new flow; and sends a NAT Entry Update message to the other peers informing the other peers of the new NAT entry and global address and global port assignments associated with the new NAT entry.

It will be appreciated that the above-described operations for creating a NAT entry for a new flow (associated with a received packet) is based upon an assumption that their currently does not exist a NAT entry for that particular flow. In situations where a NAT entry already exists for a particular flow, conventional NAT functionality may be implemented, for example, to translate a packet associated with that flow and to forward the translated packet to its final destination.

Occasionally, an event will occur which will cause one or more on-line peer NAT routers to be taken off-line. FIG. 6B illustrates an example of how the NAT resource allocation technique of the present invention may be used to respond to one or more peer NAT routers going off-line, in accordance with a specific embodiment of the present invention. In the example of FIG. 6B, it is assumed that an event occurs at (40) which causes the master peer (i.e., NAT1 504a) to go off-line. When this happens, each of the other on-line peers will detect (42a, 42b) that NAT1 has gone off-line or is otherwise unavailable. According to a specific implementation, the health and/or operational status of a given peer may be monitored by the other peers, for example, by monitoring the TCP sessions (using conventional techniques such as, for example, TCP keep-alive messages) that are established between the peers.

As shown in the embodiment of FIG. 6B when NAT1 goes off-line, fresh HSRP convergence (41) occurs for the HSRP groups to elect the active-router for the HSRP groups 509a, 509b, 509c. Additionally, when the on-line peers detect that one or more peers have gone off-line, the remaining on-line peers respond by sending (44) new Elect Master messages to the remaining on-line peers. Additionally, the old TCP sessions may be torn down, and new TCP sessions established (45) between each of the remaining on-line peers using information from the received Elect Master messages. In this way, each peer is able to accommodate changes in its own configuration as well as changes in the configurations of other on-line peers.

As shown at (46a, 46b), information from the recent Elect Master messages may be used by the remaining on-line peers to build and/or update their local Peer Resource Assignment Tables. In the example of FIG. 5, NAT2 504b currently has the relatively lowest priority value of any of the remaining on-line peers. Accordingly, using the priority information, NAT 2 will determine (48) that it is the new master. In a specific implementation, the new master may be configured to take over the HSRP functionality and/or NAT functionality performed by peer(s) which have been detected as going off-line. Accordingly, as shown at (50), NAT2 may modify its local PRA Table to take over the resource assignments of the NAT1. This may include, for example, taking over the NAT functionalities and global address and global port resource assignments previously allocated to NAT1.

After the new master peer has modified its local PRA Table to take over the resource assignments of NAT1, a new PRA Update message may be generated (52) by the new master peer which includes new Peer Resource Assignment information corresponding to the modified information contained within NAT2's local PRA Table. A PRA Update message may then be sent (54) to each of the remaining on-line peers to thereby cause the other on-line peers to update (56) their local PRA Tables in accordance with the new Peer Resource Assignment information obtained from the PRA Update message. Thereafter, as illustrated at (58), asymmetric traffic flow may continue between the internal and external network nodes, with, for example, NAT2 serving as the active router for both HSRP Group 1 509a and HSRP Group 2 509b, and NAT3 serving as the active router for HSRP Group 3 509c.

In an alternate example where a non-master peer goes off-line, the active master may take over the resource assignments which were allocated to the peer which went off-line by modifying its local PRA Table and sending PRA Update messages to the other on-line peers informing them of the changes in resource assignments.

FIG. 6C shows an example of how the NAT resource allocation technique of the present invention may be used to respond to one or more peer devices which subsequently come on-line in the private network, in accordance with a specific embodiment of the present invention. In the example of FIG. 6C, it is assumed at (60) that NAT1 comes on-line at some point following operation (58) of FIG. 6B. Once NAT1 comes back on-line, HSRP convergence (61) will occur to elect the active-router for HSRP groups 509a, 509b, 509c. Also NAT1 will broadcast (62a) an Elect Master message to the other on-line peers. Upon receiving the Elect Master message from NAT1, the other on-line peers will know that a new peer has come on-line. Accordingly, each of the other on-line peers will send out Elect Master messages (62b, 62c) during the elect master convergence interval.

Additionally, upon detecting that one or more new peers have joined the on-line peer group, the existing TCP sessions between the on-line peers may be torn down, and new TCP session are established (64a, 64b, 64c). Using information from the Elect Master messages, each of the on-line peers update their local Peer Resource Assignment Tables (66a, 66b, 66c). Based upon the new information in its local PRA Table, NAT2 will determine (68) that it is no longer the master peer since NAT1 has the relatively lowest priority value of all the on-line peers. Accordingly, NAT2 will perform (70) a PRA Table dump and NAT Table dump to the new master peer (e.g., NAT1).

According to a specific implementation, the master peer may be configured or designed to carve out new global addressing and global port resource assignments for on-line peer devices which have not yet been allocated resources from the NAT pool. Accordingly, as illustrated at (72), the data from the PRA dump and/or the NAT dump may be analyzed by NAT1 in order for NAT1 to carve out new global address and global port resource assignments (from the NAT pool) for NAT1. NAT1 will then update its local PRA Table to reflect the new global address and global port resources which have been allocated for each of the on-line peers (74). Thereafter, NAT1 will generate and send (76a, 76b) PRA Update messages to be sent to each of the other on-line peers in order to cause the other on-line peers to update their local PRA Tables in accordance with the modified/updated Peer Resource Assignment information. Thereafter, asymmetric traffic flow between the internal nodes of the private network and external nodes of the public network may continue as described previously with respect to FIG. 5, for example, with NAT1 serving as the active router for HSRP Group 1 509a, NAT2 serving as the active router for HSRP Group 2 509b, and NAT3 serving as the active router for HSRP Group 3 509c.

U.S. patent application Ser. No. 09/735,199 (CISCP191) describes a technique for implementing stateful network address translation (herein referred to as "stateful NAT") in a data network. According to the stateful NAT implementation, information relating to NAT entries which are created at the active NAT router are periodically distributed to the standby NAT router in order to allow the standby NAT router to provide fail-over capabilities. According to specific embodiments of the present invention, stateful NAT functionality may be implemented at the NAT routers of private networks such as those described, for example, in FIGS. 1 and 5 of the drawings. It will be appreciated that the various technique of the present invention as described herein provide mechanisms for managing NAT databases across multiple routers in an asymmetric routing environment. Moreover, when implemented in conjunction with stateful NAT implementation, the technique of the present invention may also help to provide redundancy-support across multiple routers in an asymmetric routing environment.

OTHER EMBODIMENTS

Generally, the various techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the various techniques of this invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. Specific examples of such network devices include routers and switches. For example, the NAT devices of this invention may be specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the various techniques of this invention may be implemented on a general-purpose network host machine such as a personal computer or workstation. Further, the invention may be at least partially implemented on a card (e.g., an interface card) for a network device or a general-purpose computing device.

Figure 8:
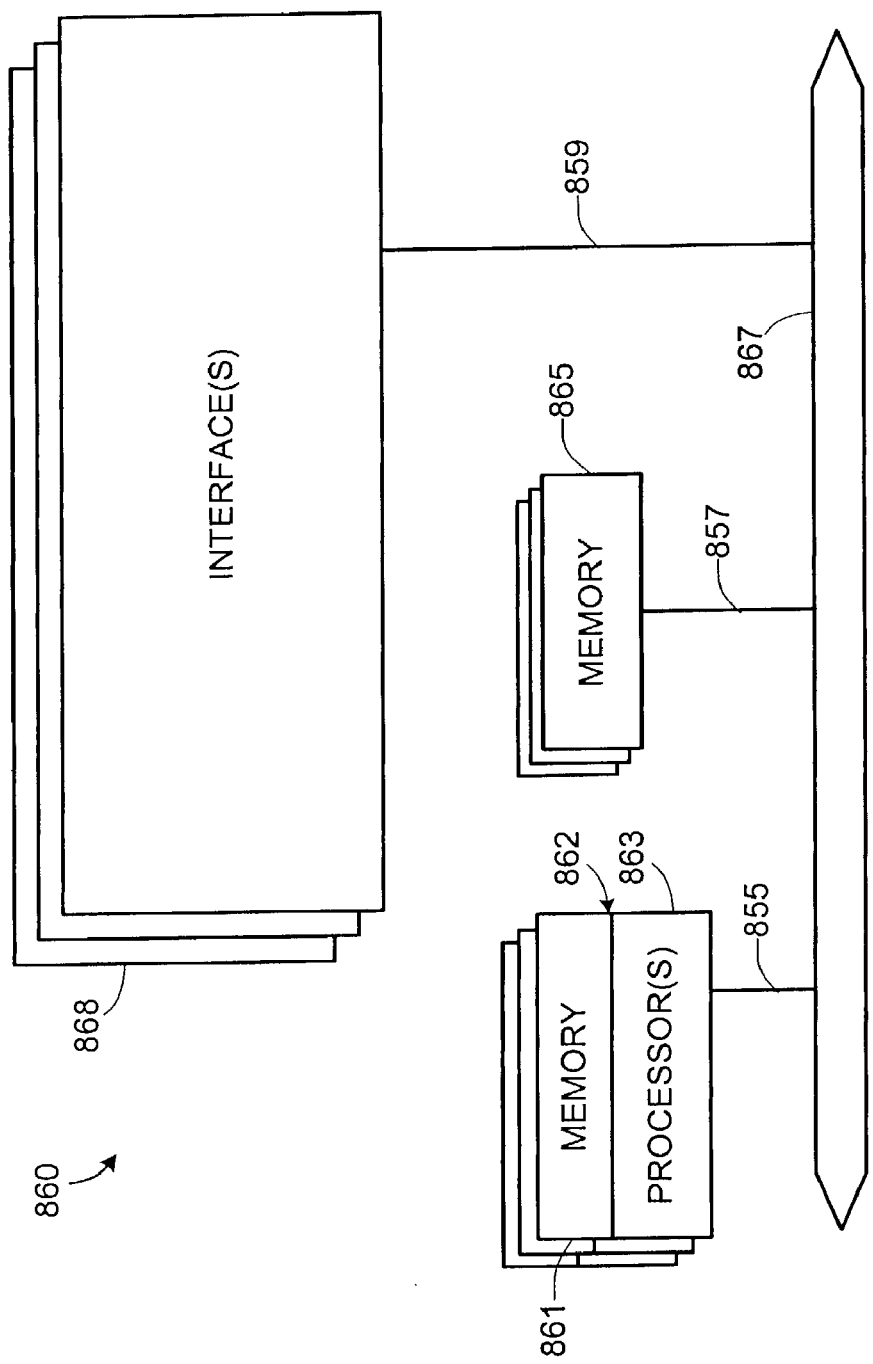
FIG. 8 shows a network device 860 suitable for implementing various aspects of the present invention.

Referring now to FIG. 8, a network device 860 suitable for implementing the various techniques of the present invention includes a master central processing unit (CPU) 862, interfaces 868, and a bus 867 (e.g., a PCI bus). When acting under the control of appropriate software or firmware, the CPU 862 may be responsible for implementing specific functions associated with the functions of a desired network device. For example, when configured as a NAT device, the CPU 862 may be responsible for analyzing packets, encapsulating packets, forwarding packets to appropriate network devices, performing network address translation, maintaining NAT state information, etc. The CPU 862 preferably accomplishes all these functions under the control of software including an operating system (e.g. Windows NT), and any appropriate applications software.

CPU 862 may include one or more processors 863 such as a processor from the Motorola family of microprocessors or the MIPS family of microprocessors. In an alternative embodiment, processor 863 is specially designed hardware for controlling the operations of network device 860. In a specific embodiment, a memory 861 (such as non-volatile RAM and/or ROM) also forms part of CPU 862. However, there are many different ways in which memory could be coupled to the system. Memory block 861 may be used for a variety of purposes such as, for example, caching and/or storing data, programming instructions, etc.

The interfaces 868 are typically provided as interface cards (sometimes referred to as "line cards"). Generally, they control the sending and receiving of data packets over the network and sometimes support other peripherals used with the network device 860. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 862 to efficiently perform routing computations, network diagnostics, security functions, etc.

Although the system shown in FIG. 8 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 865) configured to store data, program instructions for the general-purpose network operations and/or other information relating to the functionality of the various techniques described herein. The program instructions may control the operation of an operating system and/or one or more applications, for example. The memory or memories may also be configured to store data structures, peer resource allocation information, NAT information, and/or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

It is claimed:

1. A method for routing traffic in a data network, the data network including a public network and a private network, the private network including a plurality of routers adapted to provide connectivity between nodes in the private network and nodes in the public network, the plurality of routers including at least one active router adapted to perform network address translation (NAT) for traffic flowing between the public and private networks, the plurality of routers further including at least one standby router adapted to provide failover capability for the at least one active router, the method comprising:

receiving at a first router of the plurality of routers a first packet relating to a first flow between a private network node and a public network node;

associating the first flow with a first NAT entry;

starting a first timeout timer associated with the first NAT entry; and sending a Delete Query message to at least one second router of the plurality of routers in response to detecting that the first timeout timer has expired so as to query the at least one second router for selected information relating to the first NAT entry.

2. The method of claim 1 wherein the first router corresponds to an active router; and wherein the second router corresponds to a standby router.

3. The method of claim 1 wherein at least a portion of said selected information is not stored locally at the first router.

4. The method of claim 1 further comprising starting a delete response timer and restarting the delete response timer only if a response is received for the Delete Query message.

5. The method of claim 4, further comprising deleting the first NAT entry upon expiration of the delete response timer.

6. The method of claim 1 further comprising:
receiving a Delete Response message from the second router;
wherein the Delete Response message includes a timer restart value relating to an additional time period for extending a lifetime associated with the first NAT entry.

7. The method of claim 6 further comprising:
deleting the first NAT entry if the timer restart value is equal to zero; and
restarting the first timeout timer if the timer restart value is greater than zero.

8. The method of claim 7 wherein the first timeout timer is restarted in a manner such that the first timeout timer will expire after a time period substantially equal to the timer restart value.

9. A method for routing traffic in a data network, the data network including a public network and a private network, the private network including a plurality of routers adapted to provide connectivity between nodes in the private network and nodes in the public network, the plurality of routers including at least one active router adapted to perform network address translation (NAT) for traffic flowing between the public and private networks, the plurality of routers further including at least one standby router adapted to provide failover capability for the at least one active router, the method comprising:
receiving, at a first router of the plurality of routers, a first packet relating to a first flow between a private network node and a public network node;
the first packet being associated with a first NAT entry at the first router;
the first NAT entry having first local timestamp information associated therewith;
recording a first timestamp value relating to a time when the first packet was received at the first router;
updating the first local timestamp information with the first timestamp value; and
performing, at the first router, network address translation on the first packet.

10. The method of claim 9 wherein the first router corresponds to a standby router which is currently operating in a standby mode of operation, in order to provide failover capability to the at least one active router.

11. The method of claim 10 wherein the first packet corresponds to an egress-to-ingress packet sent from a public network node to a private network node.

12. The method of claim 9 further comprising receiving NAT entry update information from the at least one active router.

13. The method of claim 9 further comprising:
receiving a Delete Query message from at least one second router of the plurality of routers;
the Delete Query message being associated with the first NAT entry;
calculating a first timer restart value in response to response to receiving the Delete Query message;
wherein the first timer restart value represents an additional time period which may be used for extending a lifetime associated with the first NAT entry.

14. The method of claim 13 wherein the first router corresponds to a standby router; and
wherein the second router corresponds to an active router.

15. The method of claim 13 further comprising sending a Delete Response message from the first router to the second router;
wherein the Delete Response includes said timer restart value.

16. A system for routing traffic in a data network, the data network including a public network and a private network, the private network including a plurality of routers adapted to provide connectivity between nodes in the private network and nodes in the public network, the system comprising:
a plurality of routers;
the plurality of routers including a first active router having a memory and a processor, wherein at least one of the memory or processor of the first active router is configured to perform network address translation (NAT) for traffic flowing between the public and private networks;
the plurality of routers further including a first standby router having a memory and a processor, wherein at least one of the memory or processor of the first standby router is configured to provide failover capability for the first active router;
the at least one of the memory or processor of the first active router being further configured to receive a first ingress-to-egress packet from a first node in the private network;
the at least one of the memory or processor of the first active router being further configured to perform network address translation on the first packet, wherein the first packet is associated with a first NAT entry;
the at least one of the memory or processor of the first standby router being further configured to receive a second egress-to-ingress packet from a second node in the public network; and
the at least one of the memory or processor of the first standby router being further configured to perform network address translation on the second packet.

17. The system of claim 16 wherein the second packet is associated with the first NAT entry.

18. The system of claim 16, the at least one of the memory or processor of the first active router being further configured to forward the first packet from the first active router to the second node in the public network; and
the at least one of the memory or processor of the first standby router being further configured to forward the second packet from the first standby router to the first node in the private network.

19. A system for routing traffic in a data network, the data network including a public network and a private network, the private network including a plurality of routers adapted to provide connectivity between nodes in the private network and nodes in the public network, the system comprising:
a plurality of routers each having at least one memory and at least one processor;
the plurality of routers including at least one active router, wherein the at least one of the memory or processor of the at least one active router is configured to perform network address translation (NAT) for traffic flowing between the public and private networks;

the plurality of routers further including at least one standby router, wherein the at least one of the memory or processor of the at least one standby router is configured to provide failover capability for the at least one active router;

the at least one of the memory or processor of the routers being configured to provide asymmetric traffic flow between nodes in the private network and nodes in the public network;

wherein the at least one of the memory or processor of the at least one active router is further configured to process at least a portion of ingress-to-egress traffic flowing out from the private network; and wherein the at least one of the memory or processor of the at least one standby router is further configured to process at least a portion of egress-to-ingress traffic flowing in to the private network.

20. The system of claim 19, the at least one of the memory or processor of the routers being further configured to perform load balancing of ingress-to-egress traffic among a first plurality of NAT routers of said plurality of routers.

21. A device for routing traffic in a data network, the data network including a public network and a private network, the private network including a plurality of routers adapted to provide connectivity between nodes in the private network and nodes in the public network, the plurality of routers including at least one active router adapted to perform network address translation (NAT) for traffic flowing between the public and private networks, the plurality of routers further including at least one standby router adapted to provide failover capability for the at least one active router, the device comprising:

at least one processor;

at least one interface for providing a communication link to at least one other network device in the data network; and at least one memory;

wherein at least one processor or memory is configured to receive a first packet relating to a first flow between a private network node and a public network node;

wherein at least one processor or memory is configured to associate the first flow with a first NAT entry;

wherein at least one processor or memory is configured to start a first timeout timer associated with the first NAT entry; and wherein at least one processor or memory is configured to send a Delete Query message to at least one standby router of the plurality of routers in response to detecting that the first timeout timer has expired so as to query the at least one standby router for selected information relating to the first NAT entry.

22. The device of claim 21 wherein the device corresponds to an active router.

23. The device of claim 21 wherein at least a portion of said selected information is not stored locally at the device.

24. The device of claim 21 wherein the at least one processor or memory is configured to start a delete response timer and restart the delete response timer only if a response is received for the Delete Query message.

25. The device of claim 24, wherein the at least one processor or memory is further configured to delete the first NAT entry upon expiration of the delete response timer.

26. The device of claim 21, wherein the at least one processor or memory is further configured to receive a Delete Response message from the second router;

wherein the Delete Response message includes a timer restart value relating to an additional time period for extending a lifetime associated with the first NAT entry.

27. The device of claim 26, wherein the at least one processor or memory is further configured to delete the first NAT entry if the timer restart value is equal to zero-to restart the first timeout timer if the timer restart value is greater than zero.

28. The device of claim 27 wherein the first timeout timer is restarted in a manner such that the first timeout timer will expire after a time period substantially equal to the timer restart value.

29. A device for routing traffic in a data network, the data network including a public network and a private network, the private network including a plurality of routers adapted to provide connectivity between nodes in the private network and nodes in the public network, the plurality of routers including at least one active router adapted to perform network address translation (NAT) for traffic flowing between the public and private networks, the plurality of routers further including at least one standby router adapted to provide failover capability for the at least one active router, the device comprising:

at least one processor;

at least one interface for providing a communication link to at least one other network device in the data network; and at least one memory;

wherein the at least one processor or memory is configured to receive a first packet relating to a first flow between a private network node and a public network node;

the first packet being associated with a first NAT entry at the device;

the first NAT entry having first local timestamp information associated therewith;

wherein the at least one processor or memory is further configured to record a first timestamp value relating to a time when the first packet was received;

wherein the at least one processor or memory is further configured to update the first local timestamp information with the first timestamp value; and wherein the at least one processor or memory is further configured to perform network address translation on the first packet.

30. The device of claim 29 wherein the device corresponds to a standby router which is currently operating in a standby mode of operation.

31. The device of claim 30 wherein the first packet corresponds to an egress-to-ingress packet sent from a public network node to a private network node.

32. The device of claim 29, the at least one processor or memory being further configured to receive NAT entry update information from the at least one active router.

33. The device of claim 29, the at least one processor or memory being further configured to receive a Delete Query message from at least one second router of the plurality of routers;

the Delete Query message being associated with the first NAT entry;

the at least one processor or memory being further configured to calculate a first timer restart value in response to response to receive the Delete Query message; and wherein the first timer restart value represents an additional time period which may be used for extending a lifetime associated with the first NAT entry.

34. The device of claim 33 wherein the device corresponds to a standby router; and wherein the second router corresponds to an active router.

35. The device of claim 33, the at least one processor or memory being further configured to send a Delete Response message from the device to the second router;

wherein the Delete Response includes said timer restart value.

36. A system for routing traffic in a data network, the data network including a public network and a private network, the private network including a plurality of routers adapted to provide connectivity between nodes in the private network and nodes in the public network, the plurality of routers including at least one active router adapted to perform network address translation (NAT) for traffic flowing between the public and private networks, the plurality of routers further including at least one standby router adapted to provide failover capability for the at least one active router, the system comprising:

means for receiving at a first router of the plurality of routers a first packet relating to a first flow between a private network node and a public network node;

means for associating the first flow with a first NAT entry;

means for starting a first timeout timer associated with the first NAT entry;

means for sending a Delete Query message to at least one second router of the plurality of routers in response to detecting that the first timeout timer has expired; and wherein the Delete Query message is used to query the at least one standby router for selected information relating to the first NAT entry.

37. A system for routing traffic in a data network, the data network including a public network and a private network, the private network including a plurality of routers adapted to provide connectivity between nodes in the private network and nodes in the public network, the plurality of routers including at least one active router adapted to perform network address translation (NAT) for traffic flowing between the public and private networks, the plurality of routers further including at least one standby router adapted to provide failover capability for the at least one active router, the system comprising:

means for receiving, at a standby router of the plurality of routers, a first packet relating to a first flow between a private network node and a public network node;

the first packet being associated with a first NAT entry at the standby router;

the first NAT entry having first local timestamp information associated therewith;

means for recording a first timestamp value relating to a time when the first packet was received at the standby router;

means for updating the first local timestamp information with the first timestamp value; and means for performing, at the standby router, network address translation on the first packet;

wherein the standby router which is operating in a standby mode of operation.

\* \* \* \* \*